United States Patent [19]

Förster et al.

[11] 3,942,393
[45] Mar. 9, 1976

[54] DEVICE FOR THE CONTROL OF SHIFTING MEMBERS OF AUTOMATIC CHANGE-SPEED TRANSMISSIONS

[75] Inventors: Hans-Joachim M. Förster; Georg Eltze; Hans Steinbrenner, all of Stuttgart, Germany

[73] Assignee: Daimler-Benz Aktiengesellschaft, Germany

[22] Filed: May 12, 1972

[21] Appl. No.: 252,559

[30] Foreign Application Priority Data
May 14, 1971  Germany............................ 2124024

[52] U.S. Cl.................. 74/866; 74/752 A; 74/867; 192/103 C; 74/862
[51] Int. Cl.²......................................... B60K 41/10
[58] Field of Search............. 74/866, 867, 868, 869, 74/752 A, 752 D; 192/103 C

[56] References Cited
UNITED STATES PATENTS

| | | |
|---|---|---|
| 3,680,410 | 8/1972 | Sumiyoshi et al..................... 74/866 |
| 3,701,294 | 10/1972 | Ito et al. ............................... 74/866 |
| 3,710,630 | 1/1973 | Sumiyoshi et al................ 74/866 X |
| 3,710,651 | 1/1973 | Marumo et al. .................. 74/866 X |
| 3,732,755 | 5/1973 | Beig et al............................. 74/866 |
| 3,747,438 | 7/1973 | Toyoda et al......................... 74/866 |
| 3,750,495 | 8/1973 | Ito et al. ............................... 74/866 |

FOREIGN PATENTS OR APPLICATIONS
1,120,132   1968   United Kingdom............ 192/103 C

*Primary Examiner*—Samuel Scott
*Assistant Examiner*—John O. Reep
*Attorney, Agent, or Firm*—Craig & Antonelli

[57]   ABSTRACT

A control system for regulating or controlling the actuating force of shifting elements which in automatically shifted change-speed transmissions act on friction elements that selectively brake, hold fast and release a structural element of such a change-speed transmission as a function of operating parameters; one of the operating parameters which is thereby used in the system of this invention is the predetermined change of the engine rotational speed as a function of time (dn/dt).

41 Claims, 6 Drawing Figures

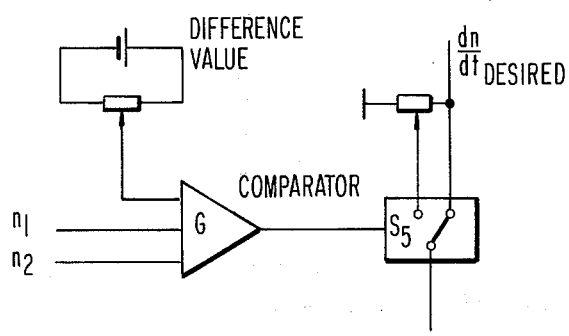
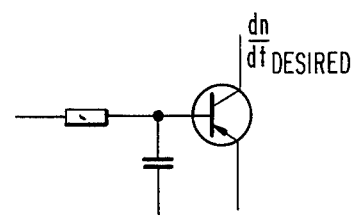
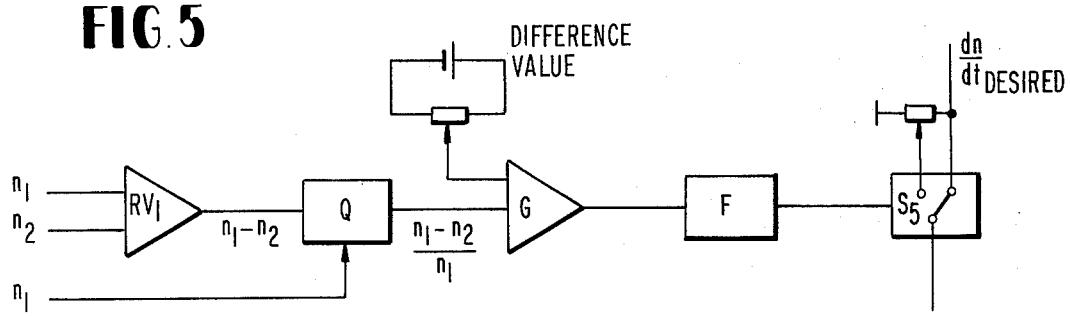
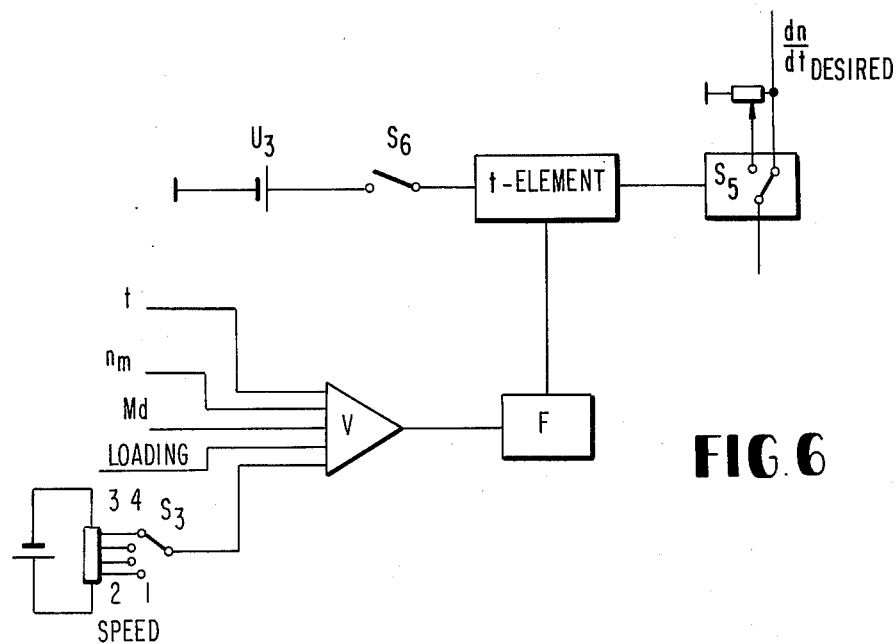

DEVICE FOR THE CONTROL OF SHIFTING MEMBERS OF AUTOMATIC CHANGE-SPEED TRANSMISSIONS

The present invention relates to an installation for the regulation or control of the actuating force of shifting members, which in automatically shifted change-speed transmissions act on friction elements that selectively brake, hold fast and release a structural element of such a change-speed transmission in dependence on operations parameters.

Automatically shifted transmissions utilize customarily planetary gear sets which are shifted by means of force-locking servo-members (lamellae clutches as well as band or lamellae brakes). Shifting-up operations without the interruption of power flow are thereby possible by a suitable matching of engagement and disengagement of the servo-members participating in the speed change. When shifting-up, for example, from first to second speed, the engine rotational speed which initially has a predetermined high value, has to be lowered to a lower rotational speed value corresponding to the transmission jump between the two speeds. Up to the end of this rotational speed decrease, slippage exists in the servo-member that has been newly engaged, and heat is therefore produced thereat. By reason of the deceleration of the engine (decrease of the kinetic energy), a torque overincrease occurs at the output during the shifting period, whose sudden beginning and end are noticed as shifting shock as soon as the torque jump exceeds a predetermined amount. A general reduction of the torque overincrease over the duration of the shifting operation by a decrease of the oil pressure increases the shifting time and is possible in the respective servo member only up to a predetermined limit by reason of the increase of the heat development connected therewith. A further reduction of the shifting pressure therebeyond is possible only by a brief pressure decrease at the beginning and at the end of the shifting operation.

It is known to reduce the jerk at the beginning of the shifting operation when shifting-up, by the application of so-called accumulators or receivers. These accumulators or receivers supply a working pressure for the respective shifting member increasing as a function of time. One obtains thereby a soft engagement and simultaneously a sufficient excess for the holding condition of the lamellae clutch or of the brake band.

With this type of pressure control, the end of the shifting operation cannot be improved. A soft transistion at the end of the operation would mean that shortly prior to the end of the shifting operation, the working pressure is again being decreased and is brought back again to its safety value only after completed shifting operation.

An automatically shifted change-speed transmission functioning well over a long period of time, which shifts with the aid of friction elements, presupposes that the friction value varies only within very narrow limits. The solution of this task is difficult and it requires a high expenditure to match oil and friction element in such a manner that the problem can be solved.

It is the aim of the present invention to provide a device of the aforementioned type in which one is free of the conditions of the constancy of the friction value.

The underlying problems are solved according to the present invention in that the operating parameter is the predetermined change of the engine rotational speed as a function of time (dn/dt).

Accordingly, it is an object of the present invention to provide a control system for controlling the shifting members of automatic change-speed transmissions which avoids by simple means the aforementioned shortcomings and drawbacks encountered in the prior art.

Another object of the present invention resides in an installation for controlling the shifting members of automatic change-speed transmissions which assures a soft engagement of the speeds, particularly both at the beginning and at the end of a shifting operation.

A further object of the present invention resides in an installation for controlling the shifting members of automatically shifted change-speed transmissions in which shifting shocks and jerks are effectively minimized if not completely eliminated by simple means.

Still another object of the present invention resides in a shifting control system of the type described above which is relatively independent of the friction value.

These and other objects, features, and advantages of the present invention will become more apparent from the following description when taken in connection with the accompanying drawing which shows, for purposes of illustration only, several embodiments in accordance with the present invention, and wherein:

FIG. 3 is a block diagram for a modified embodiment of the control system of FIG. 2;

FIG. 4 is a schematic circuit diagram for use in a control system of the present invention to achieve a still softer transition;

FIG. 5 is a block diagram for a modified embodiment of the system of FIG. 2 to produce a still better adaptation; and FIG. 6 is a block diagram of a modified embodiment of a control system in accordance with the present invention for a still further improved rounding-off of the transitions.

Figure 1:
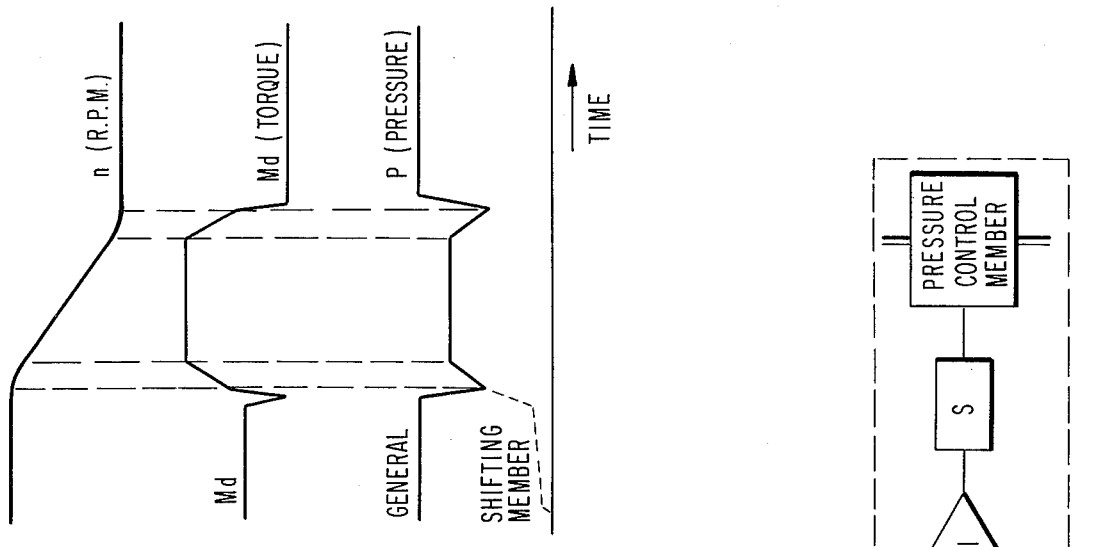
FIG. 1 is a schematic diagram illustrating the characteristic curves of speed, torque and pressure as a function of time in a shifting control installation according to the present invention.

Referring now to the drawing, wherein like reference numerals are used through the various views to designate like parts, and more particularly to FIG. 1, this figure illustrates at the top the curve for the desired progress of the engine rotational speed $n$ when shifting-up. Such a curve configuration can be achieved with the measures to be described more fully hereinafter. The torque progress Md at the transmission output is indicated by the center curve. A higher output torque is associated with the left higher engine rotational speed than with the right lower rotational speed. Disposed therebetween is a range of initially increased torque. The lower curve finally illustrates the oil pressure $p$ in the supply line which is influenced by the measures to be described more fully hereinafter. All curves are indicated schematically. The higher pressure level always exists when no shifting operation is to be initiated or to be terminated, and more particularly the general shifting pressure. The curve in dash line shows the pressure in the shifting member of the speed to be engaged.

It is desirable during the shifting operation that during the braking of the engine, a certain rotational speed deceleration ($dn/dt$) is not exceeded. The magnitude of the permissive $dn/dt$ under certain circumstances is to be dependent on the one hand, on the engine rotational speed, in the best way at the beginning of the shifting operation, and on the other, on the existing engine torque. Additionally, a dependence may also be desirable on the type of change in speed, i.e., whether shifting from third into fourth or from second into third speed, etc., on the transmission oil temperature, on the load condition of the vehicle, etc.

However, also more simple controls are feasible within the scope of the present invention in which the operating parameter is, for example, only the engine rotational speed alone or in which also individual ones of the aforementioned operating parameters are omitted.

Figure 2:
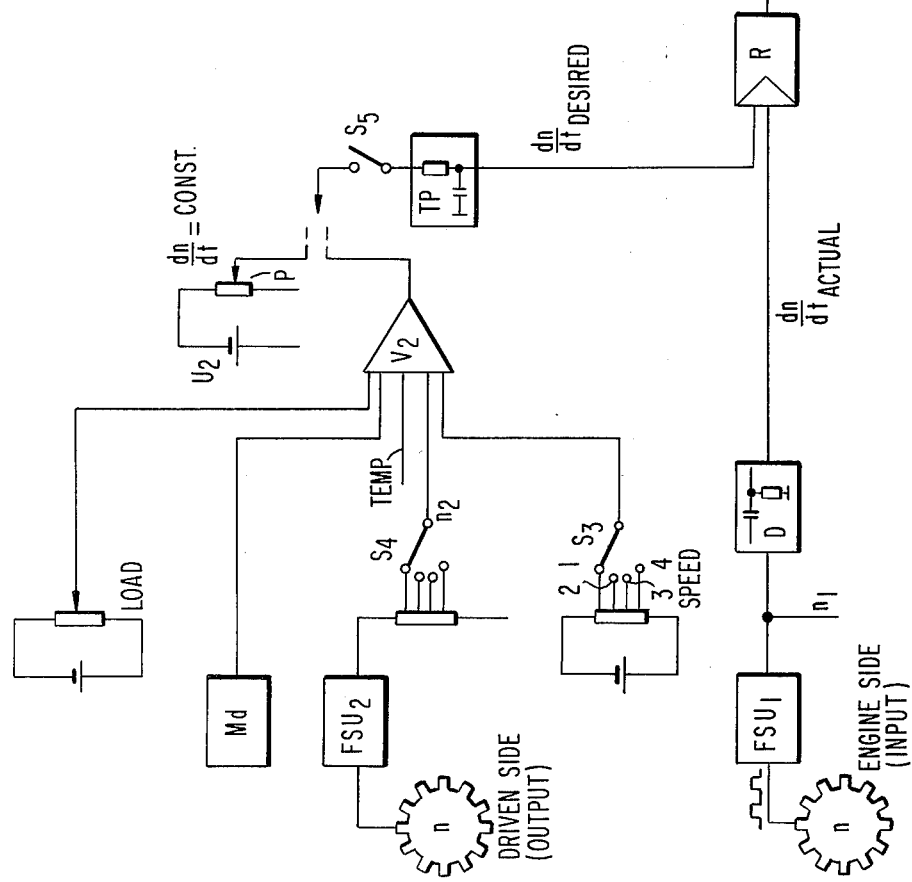
FIG. 2 is a block diagram for a control system in accordance with the present invention.

FIG. 2 illustrates a control installation which controls the working pressure for the respective shifting member corresponding to a predetermined $dn/dt$. At first, the working pressure is determined as a function of the torque, the temperature and the rotational speed by the use of a constant voltage $U_1$ applied to an amplifier $V_1$ by way of a switch $S_1$; the amplifier $V_1$ controls the control stage S for the respective pressure control member. Consequently, initially a constant pressure corresponding to the aforementioned values and magnitudes exists. If the shifting-up operation is initiated, then at the end of the filling of the working cylinder of the shifting element, the switch $S_1$ and the switch $S_2$ are shifted over. By shifting over the switch $S_1$, at first the voltage $U_1$ is reduced by a predetermined amount $1/K$. As a result thereof, the "constant" oil pressure decreases. The control device R is connected with the aid of the switch $S_2$ to the point of summation of the operational amplifier $V_1$ of any conventional construction. As a result thereof, the control required during the shifting operation can now be carried out, and more particularly in the following manner:

The "intended" or "desired" value for $dn/dt$ is now applied to one input of the control device R while the "existing" or "actual" value is applied to the other input of the control device R. The control device R is of any conventional construction as known in logic circuitry, for example, a suitable operational amplifier. The "actual" or "existing" value is formed as follows: The rotational speed is measured at the engine, or still better at the input of the change-speed transmission. For that purpose, all known methods are feasible (d.c.-a.c. generator, pulse method, etc.). In the instant case, the exmaple of the detection of the rotational speed with the aid of pulses will be discussed. A gear then exists at the measuring place while the detection can take place either photoelectrically or magnetically. The pulses are converted in a conventional frequency-voltage converter $FSU_1$ into a voltage proportional to the rotational speed whereby the usual arrangement is used in which the pulses control a monostable flip-flop circuit which supplies rectangular pulses of accurately defined area content. These pulses are already proportional to the rotational speed $n_1$. They are subsequently filtered in a filtering element. At the output of the filter element, one then obtains a d.c. voltage accurately proportional to the rotational speed. The rotational speed progress is determined in a differentiating element D of conventional construction. At the output of the differentiating element D, one now has the "actual" or "is" value for $dn/dt$.

The desired value for $dn/dt$ may be, for example, a defined voltage which can be taken off at a potentiometer P from a voltage source $U_2$.

An absolutely constant value for $dn/dt$, however, is unfavorable. The value of $dn/dt$ should be capable of being varied corresponding to the existing rotational speed, the torque, the change-speed in question, the load, the operating temperature and, above all, the rotational speed as described hereinabove.

This is realized in the following manner: For obtaining this existing or "is" value for $dn/dt$, voltages are fed to an operational amplifier $V_2$, which stem or are derived from the torque, the rotational speed and the temperature. Since depending on the change in speed or transmission ratio, the shifting operation has to be more rapid or more slow, also the change in speed has to be given as an input. To that end, a switch $S_3$ is provided in the transmission; the switch $S_3$ picks up one of the voltages $U_1$-$U_4$ which are supplied from a constant voltage source so that corresponding to the speed, larger or smaller voltages are predetermined which are applied to the operational amplifier $V_2$. For detecting the load condition, one may proceed from the inward spring deflection. It then has to be connected with a member measuring the spring deflection, for example, with a potentiometer. Of course, one may also start with the level regulation. The pressure has to be detected in that case, and the pressure has to be used for establishing a pressure-dependent voltage. For the introduction of the dependency of the rotational speed or drive velocity, initially the measurement of the rotational speed on the output side is necessary. In the illustrated embodiment, the pulse method with a frequency-voltage converter is again provided. The rotational speed produced by the output side then has to be translated to the input side. This takes place with the aid of the switch $S_4$ which like switch $S_3$ indicates the speed position and therewith converts or translates the output rotational speed corresponding to the engaged speed. The voltage picked-up by switch $S_4$ is also applied to the operational amplifier $V_2$.

In case of lesser demands as regards the shifting behavior, also the engine rotational speed may be utilized in lieu of the output rotational speed whereby the translation can then be dispensed with.

A voltage now results at the output of the operational amplifier $V_2$ which is composed of all of these components. This voltage is the "intended" or "desired" value for $dn/dt$.

As soon as $S_1/S_2$ is actuated, i.e., engaged during the beginning of the shifting operation, the control operation is initiated and an oil pressure for the control of the change-speed transmission results in the pressure-regulating member which is controlled corresponding to the predetermined $dn/dt$.

The transition during the beginning of the shifting operation is the softer the slower the control system operates. In order therefore to obtain a soft transition, the control itself can be influenced in that one provides, for example, nozzles as throttle points in the oil line. However, one can also engage only slowly the desired value setting or signal. For example, an RC-element constructed as low-pass filter can be utilized, or one can engage slowly the rotational speed signal necessary for the desired value in that one designs correspondingly the filter elements present in the frequency-voltage converter $FSU_2$.

A rounding-off of the transition at the end of the shifting operation can be achieved only in that the dn/dt-value is reduced at the end of the shifting operation so that also the actual value is reduced. Either a simple shifting or switching can take place thereby or also a reduction may take place, for example, with the aid of a potentiometer according to a predetermined program. In order to achieve this, the end of the shifting operation has to be known beforehand or possibly has to be computed continuously.

A solution for computing the end of the shifting operation by a rotational speed comparison is shown in FIG. 3. The two rotational speeds $n_1$ (engine rotational speed according to FIG. 2) and $n_2$ (output rotational speed translated to the engine side according to FIG. 2) are applied to a conventional comparator G. If the engine rotational speeds have become equal, then the comparator G flips over. A voltage is produced in its output, whereby a switch $S_5$ can be shifted over. This switch $S_5$ can be represented by a relay or also by a conventional gate circuit. In the switched-over position, only a part of the previously existing dn/dt-value is detected and transmitted. A rounding-off of the shifting operation is achieved thereby, even though only at an instant at which the rotational speeds are already equal which is too late. In order to obtain the reduction of the desired value already at a pre-determined differential rotational speed, a d.c. voltage is additionally applied to the comparator G which permits to so displace the zero point of the comparator G that the flipping over occurs at a predetermined rotational speed difference.

In many cases it is desirable not only to switch-over the desired value but to control the same slowly in order to obtain a more soft transition. This is possible, for example, according to FIG. 4 by means of an RC-element, which controls slowly a transistor connected in the line of the desired value transmitter when the comparator G has flipped over.

The use of an absolute differential rotational speed for switching-over the desired value is not favorable because at lower rotational speeds, the rounding-off of the transition is too large and at high rotational speeds too small. A device is therefore provided according to this invention which controls the engagement of the desired value change not in dependence of an absolute rotational speed but in dependence on a relative rotational speed. This takes place according to FIG. 5 as follows: Initially, the rotational speed signals $n_1$ and $n_2$ again are applied to an operational amplifier $RV_1$. The difference $n_1-n_2$ is formed in the operational amplifier $RV_1$. This value is applied to a quotient former Q of conventional construction in which the desired quotient $$n_1 - n_2/n_1$$

is formed with the aid of the rotational speed $n_2$.

The usual methods are applicable for the quotient formation, for example, the time-division method. This quotient now reaches the comparator G as before, to which is applied additionally—as before—the differential value to be adjusted. In this embodiment, a function former F of conventional construction is provided which may consist, for example, of a series of biased diodes. The function former F can further change the quotient according to a predetermined function. This switch $S_5$ or the RC-element with the transistor (FIG. 4) is again connected in the output of the function former F, as described above.

If according to the circuit illustrated in FIG. 2 the value for dn/dt is so selected in dependence on the different magnitudes that for all possible shifting operations necessarily the same shifting time results, then also a more simple timing-circuit can be realized as illustrated in the upper part of FIG. 6. However, it is assumed in connection with these considerations that the output rotational speed does not vary very strongly during the shifting operation.

By means of switch $S_6$ disposed at the transmission which operates like the switch $S_1$ and $S_2$ (FIG. 2), a voltage $U_3$ is applied to a time element at the beginning of the shifting operation. The time element may be, for example, a customary monostable flip-flop circuit. The time element runs out and after its return actuates the switch $S_5$ whereby the change-over of the desired value is realized. However, if the shifting time is not constant but if dependencies on the temperature of the transmission, on the engine rotational speed, on the torque and on the load and the engaged speed exist, then the system according to FIG. 6 can be complemented as follows: The time element is thereby changed in its time-delay corresponding to the aforementioned factors. A change of the time-constant of the time-element with a monostable flip-flop is possible, for example, in that one varies the supply voltage of the time-element. For this purpose, the aforementioned individual factors are applied to an operational amplifier V and are added thereat. The result is fed to a function former F again of conventional construction which permits the introduction of a functional relationship as a function of the magnitudes and therewith controls the time element described hereinabove so that is starts under all operating conditions always shortly before the end of the shifting operation.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. An installation for the regulation or control of the actuating force of shifting members which in automatically shifted change-speed transmissions act on friction elements that selectively brake, hold fast, and release a structural element of such a change-speed transmission in dependence on operating parameters of a vehicle, characterized by a control system for controlling said actuating force including control means for varying sid actuating force as a function of at least one operating parameter corresponding to a desired change of engine rotational speed as a function of time (dn/dt), and means for calculating the desired dn/dt in accordance with other vehicle parameters, the control means controlling the oil pressure which serves as an actuating force of the shifting member, said control means varying the oil pressure from an upper level to a lower level and causing the oil pressure to drop from the upper level to below the lower level and then rise to the lower level at the beginning of a shifting operation.

2. An installation according to claim 1, wherein said control means causes the oil pressure to drop below the lower level and then rise to the upper level at the end of a shifting operation.

3. An installation according to claim 1, characterized in that the control means includes means for influencing said operating parameter of the desired dn/dt by the engine rotational speed.

4. An installation according to claim 3, characterized in that said last-mentioned means influences said operating parameter of the desired dn/dt by the engine rotational speed at the beginning of the shifting operation.

5. An installation according to claim 4, characterized in that the control means includes means for influencing the operating parameter by the engine torque.

6. An installation according to claim 1, characterized in that the control means includes means for influencing the operating parameter by the engine torque.

7. An installation according to claim 6, characterized in that said control means includes means for influencing the operating parameter by the shifting direction and selected shifting step.

8. An installation according to claim 7, characterized in that said control means includes means for influencing said operating parameter by the transmission oil temperature.

9. An installation according to claim 1, characterized in that said control means includes means for influencing the operating parameter by the shifting direction and selected shifting step.

10. An installation according to claim 1, characterized in that said control means includes means for influencing said operating parameter by the transmission oil temperature.

11. An installation for the regulation or control of the actuating force of shifting members which in automatically shifted change-speed transmissions act on friction elements that selectively brake, hold fast, and release a structural element of such a change-speed transmission in dependence on operating parameters, characterized by a control system for controlling said actuating force including control means for varying said actuating force as a function of at least one operating parameter corresponding to a predetermined desired change of engine rotational speed as a function of time (dn/dt), means for producing the desired value of dn/dt and means for producing an existing value of dn/dt, said control means including a control circuit means having an adding means controlling a respective shifting member, said adding means having several inputs, one input being connected with a first switching means which applies to the one input of the adding means in one position a voltage corresponding to at least one parameter and in its other position said last-mentioned voltage reduced by a predetermined amount, another input of the adding means being controlled by a control amplifier means having several inputs, one input of said control amplifier means being controlled by the existing value of dn/dt and another input thereof being controlled by the desired value of dn/dt.

12. An installation according to claim 11, wherein the voltage applied to the one input of the adding means corresponding to several parameters such as temperature, rotational speed and torque.

13. An installation according to claim 11, characterized in that the existing value is produced by a circuit means which includes frequency converter means receiving pulses proportional to the engine rotational speeds and producing in its output rectangular pulses of defined area content, and a differentiating element connected in the output of said frequency converter means.

14. An installation according to claim 11, characterized in that the desired value is supplied by a constant voltage source whose voltage is substantially equal to the desired value dn/dt.

15. An installation according to claim 11, characterized in that a second adding means having several inputs is provided whose one input is connected to a voltage corresponding to the engine torque, whose second input is connected to a voltage corresponding to the driving velocity and whose third input is connected to a voltage corresponding to the engaged speed, and in that the output of the second adding means is operatively connected with said another input of the control amplifier means.

16. An installation according to claim 15, characterized in that a voltage corresponding to at least temperature is applied to a further input of the second adding means.

17. An installation according to claim 15, characterized in that the voltage corresponding to the driving velocity is determined by the output rotational speed of the change-speed transmission influenced by the engaged speed.

18. An installation according to claim 11, characterized in that a time-delay means is connected into the control circuit means.

19. An installation according to claim 18, characterized in that said time-delay means is an electric low-pass filter.

20. An installation according to claim 11, characterized in that the desired value input of the control amplifier means is connected with a switching means with several inputs to be selectively engaged, the condition of said last-mentioned switching means being controlled by the output of a comparator means having several inputs, said comparator means receiving at its inputs a first voltage corresponding to the engine rotational speed, a second voltage corresponding to the driving velocity and a third voltage causing the comparator means to flip over at a time prior to equality of the first and second voltages, and in that one input of the switching means is connected with a voltage source that corresponds to the desired value of dn/dt whereas the other input is connected with the same voltage reduced by a predetermined constant factor.

21. An installation according to claim 20, characterized in that a time-delay element is connected in the feed line of the circuit means corresponding to the desired value.

22. An installation according to claim 21, characterized in that the time-delay element is an RC-element which slowly controls a transistor connected in the circuit means of the desired value transmitter during the flipping over of the comparator means.

23. An installation according to claim 11, characterized in that the desired value input of the control amplifier means is connected with a switching means whose condition is controlled by the output of a comparator means having several inputs, in that a subtracting means is provided having two inputs to which is applied a voltage corresponding to the engine rotational speed and a voltage corresponding to the driving velocity, respectively, in that the output of the subtracting means is connected with the input of a quotient former means whose other input receives a voltage corresponding to the engine rotational speed, and in that the voltage resulting in the output of the quotient former means and corresponding to the value of $(n_1 - n_2)/n_1$ is supplied to the comparator means.

24. An installation according to claim 23, characterized in that a further voltage is applied to an input of the comparator means causing the comparator means to flip over at a predetermined value of the output of quotient former means.

25. An installation according to claim 23, characterized in that a function former means is provided between the comparator means and the switching means.

26. An installation according to claim 11, characterized in that a time-element is provided whose input voltage is adapted to be selectively applied by a transmission-switch, and in that a switching means for the desired value is connected in the output of the time element.

27. An installation according to claim 26, characterized in that voltages corresponding to the operating parameters to be considered are applied to the inputs of an amplifier means, that a function generator means is operatively connected to the output of the last-mentioned amplifier means and in that the time constant of the timing element is controllable by the output voltage of the function generator means.

28. An installation according to claim 13, characterized in that the desired value is supplied by a constant voltage source whose voltage is substantially equal to the desired value dn/dt.

29. An installation according to claim 13, characterized in that a second adding means having several inputs is provided whose one input is connected to a voltage corresponding to the engine torque, whose second input is connected to a voltage corresponding to the driving velocity and whose third input is connected to a voltage corresponding to the engaged speed, and in that the output of the second adding means is operatively connected with said another input of the control amplifier means.

30. An installation according to claim 29, characterized in that a voltage corresponding to temperature is applied to a further input of the second adding means.

31. An installation according to claim 30, characterized in that the voltage corresponding to the driving velocity is determined by the output rotational speed of the change-speed transmission influenced by the engaged speed.

32. An installation according to claim 29, characterized in that a time-delay means is connected into the control circuit means.

33. An installation according to claim 32, characterized in that said time-delay means is an electric low-pass filter.

34. An installation according to claim 30, characterized in that the desired value input of the control amplifier means is connected with a switching means with several inputs to be selectively engaged, the condition of said last-mentioned switching means being controlled by the output of a comparator means having several inputs, said comparator means receiving at its inputs a first voltage corresponding to the engine rotational speed, a second voltage corresponding to the driving velocity and a third voltage causing the comparator means to flip over at a time prior to equality of the first and second voltages, and in that one input of the switching means is connected with a voltage source that corresponds to the desired value of dn/dt whereas the other input is connected with the same voltage reduced by a predetermined constant factor.

35. An installation according to claim 34, characterized in that a time-delay element is connected in the feed line of the circuit means corresponding to the desired value.

36. An installation according to claim 35, characterized in that the time-delay element is an RC-element which slowly controls a transistor connected in the circuit means of the desired value transmitter during the flipping over of the comparator means.

37. An installation according to claim 31, characterized in that the desired value input of the control amplifier means is connected with a switching means whose condition is controlled by the output of a comparator means having several inputs, in that a subtracting means is provided having two inputs to which is applied a voltage corresponding to the engine rotational speed and a voltage corresponding to the driving velocity, respectively, in that the output of the subtracting means is connected with the input of a quotient former means whose other input receives a voltage corresponding to the engine rotational speed, and in that the voltage resulting in the output of the quotient former means and corresponding to the value of $(n_1 - n_2)/n_1$ is supplied to the comparator means.

38. An installation according to claim 37, characterized in that a further voltage is applied to an input of the comparator means causing the comparator means to flip over at a predetermined value of the output of quotient former means.

39. An installation according to claim 28, characterized in that a function former means is provided between the comparator means and the switching means.

40. An installation according to claim 13, characterized in that a time-element is provided whose input voltage is adapted to be selectively applied by a transmission-switch, and in that a switching means for the desired value is connected in the output of the time element.

41. An installation according to claim 40, characterized in that voltages corresponding to the operating parameters to be considered are applied to the inputs of an amplifier means, that a function generator means is operatively connected to the output of the last-mentioned amplifier means and in that the time constant of the timing element is controllable by the output voltage of the function generator means.

* * * * *